US012693832B2

(12) United States Patent
Durvasula et al.

(10) Patent No.: US 12,693,832 B2
(45) Date of Patent: Jul. 28, 2026

(54) AUTOGENERATED PRIVATE METAVERSE

(71) Applicant: TEACHERS INSURANCE AND ANNUITY ASSOCIATION OF AMERICA, New York, NY (US)

(72) Inventors: Sastry Vsm Durvasula, Phoenix, AZ (US); Swatee Singh, Livingston, NJ (US); Rares Ioan Almasan, Paradise Valley, AZ (US); Sonam Jha, Short Hills, NJ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 254 days.

(21) Appl. No.: 18/428,882

(22) Filed: Jan. 31, 2024

(65) Prior Publication Data

US 2025/0244957 A1     Jul. 31, 2025

(51) Int. Cl.
| | |
|---|---|
| *G06K 9/62* | (2022.01) |
| *G06F 3/04815* | (2022.01) |
| *G06F 8/30* | (2018.01) |
| *G06T 19/00* | (2011.01) |
| *G06V 10/764* | (2022.01) |

(52) U.S. Cl.
CPC ............ *G06F 8/30* (2013.01); *G06F 3/04815* (2013.01); *G06T 19/006* (2013.01); *G06V 10/764* (2022.01)

(58) Field of Classification Search
CPC ........ G06F 8/30; G06F 3/04815; G06F 3/011; G06T 19/006; G06V 10/764
See application file for complete search history.

(56) References Cited

U.S. PATENT DOCUMENTS

| | | | | |
|---|---|---|---|---|
| 12,309,182 | B1 * | 5/2025 | McAleer | ................. G06F 9/455 |
| 2019/0026958 | A1 * | 1/2019 | Gausebeck | ............ G06T 7/579 |
| 2020/0271450 | A1 * | 8/2020 | Gorur Sheshagiri | ... G06F 1/163 |
| 2021/0150818 | A1 * | 5/2021 | Dedonato | ............... G06F 3/011 |

* cited by examiner

*Primary Examiner* — Xin Jia
(74) *Attorney, Agent, or Firm* — MARSHALL, GERSTEIN & BORUN LLP

(57) ABSTRACT

System, method, and apparatus for generating a metaverse are provided. The method comprises: receiving data associated with an object associated with the event; codifying at least a portion of the data to generate a set of codified input associated with the object; determining a three-dimensional (3D) model of the object based on the set of codified input; generating a set of output code based on the set of codified input, the 3D model, and infrastructure as code; and transmitting, to a user device, the set of output code to cause the user device to present a 3D artifact in the metaverse corresponding to the object.

20 Claims, 12 Drawing Sheets

300

Receive data associated with an object

310

Codify at least a portion of the data

320

Determine a 3D model of the object

330

Generate a set of output code

340

Transmit the set of output code to a user device

350

3200

From 310 in FIG. 3

Extract a first set of characteristics from an image of the data

3202

Classify the image based on the first set of characteristics

3204

Extract a second set of characteristics from the image

3206

Label the second set of characteristics

From 320 in FIG. 3

Determine a plurality of candidate 3D models based on data associated with the event

3302

Select a 3D model from the candidate models

3304

Modify the 3D model based on the input code

From 350 in FIG. 3

Receive a request from a user device to interact with the 3D artifact
602

The user has permission to interact with the object?
604

Yes

No

Receive data of a user interaction with the object
606

Reject the request
614

Codify the data of the user interaction
608

Generate a second set of output code
610

Transmit the second set of output code to the user device
612

600B

From 350 in FIG. 3

Receive a prompt from a user device — 620

Generate a response — 622

Response associated with the 3D artifact? — 624

Yes — 628

No — 626

Generate code for a visual effect associated with the 3D artifact

Transmit the response to the user device

630

Transmit the response and the code for visual effect to the user device

AUTOGENERATED PRIVATE METAVERSE

FIELD OF TECHNOLOGY

The present disclosure relates to generating a metaverse, and more particularly, to generating a private metaverse using one or more artificial intelligence (AI) models.

BACKGROUND

A metaverse is a virtual environment that can be shared by multiple users who can interact with each other and with digital content. People attending an event virtually via a metaverse may have an immersive experience that is similar to a real-world experience. Conventional techniques for generating a metaverse may involve a substantial amount of human labor, including manually processing data, manually constructing 3D artifacts based on customer's specific needs, etc. Such processes may require engineers to work for many months. Further, a public metaverse may be vulnerable to illegal access. Therefore, techniques for automatically generating a private, attack-resist metaverse is needed.

SUMMARY

One exemplary embodiment of the present disclosure may be a method for generating a metaverse for an event. The method, implemented by one or more processors, may comprise: receiving data associated with an object associated with the event; codifying at least a portion of the data to generate a set of codified input associated with the object; determining a three-dimensional (3D) model of the object based on the set of codified input; generating a set of output code based on the set of codified input, the 3D model, and infrastructure as code; and transmitting, to a user device, the set of output code to cause the user device to present a 3D artifact in the metaverse corresponding to the object.

Another exemplary embodiment of the present disclosure may be a computer system for generating a metaverse for an event. The system may include: one or more processors; and a memory having stored thereon a set of computer-executable instructions. The set of computer-executable instructions, when executed by the processors, cause the one or more processors to: receive data associated with an object associated with the event; codify at least a portion of the data to generate a set of codified input associated with the object; determine a three-dimensional (3D) model of the object based on at least a portion of the set of codified input; generate a set of output code based on the set of codified input, the 3D model, and infrastructure as code; and transmit, to a user device, the set of output code to cause the user device to present a 3D artifact in the metaverse corresponding to the object.

Yet another exemplary embodiment of the present disclosure is non-transitory computer readable storage medium for generating a metaverse for an event. The non-transitory computer readable storage medium having stored thereon a set of computer readable instructions that, when executed, may cause one or more processors to: receive data associated with an object associated with the event; codify at least a portion of the data to generate a set of codified input associated with the object; determine a three-dimensional (3D) model of the object based on at least a portion of the codified input; generate a set of output code based on the set of codified input, the 3D model, and infrastructure as code;

and transmit, to a user device, the set of output code to cause the user device to present a 3D artifact in the metaverse corresponding to the object.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The disclosure provides a method and system for generating a metaverse. In some embodiments, the system generates the metaverse using one or more generative AI models. The AI models enables the system to determine completeness of data automatically, generate 3D artifacts for objects in the metaverse automatically, and/or show a user's interactions with the 3D artifacts in real-time. Therefore, the techniques disclosed herein allow a computing system to generate a metaverse on the fly; and only minimal human intervention, if any, is needed in the process. Further, the system may automatically generate a metaverse based on a user's preferences automatically.

Further, the system may use continuous learning techniques to continuously update the AI models for generating a metaverse. For example, the system may continuously train the AI models by using data and code from events that occur after the AI models are initially trained. In this way, the AI models may be improved over time and meet users' new demands without a cumbersome, separate retraining process.

Finally, the system may generate a private metaverse in which the system implements a zero-trust policy. That is, the system may allow a user to interact with a 3D artifact only if the system determines that the user has permission to do so. In this way, the metaverse is more resistant to illegal access.

Other advantages and benefits will become clear in view of the detailed description below.

Example Computing System

Figure 1:
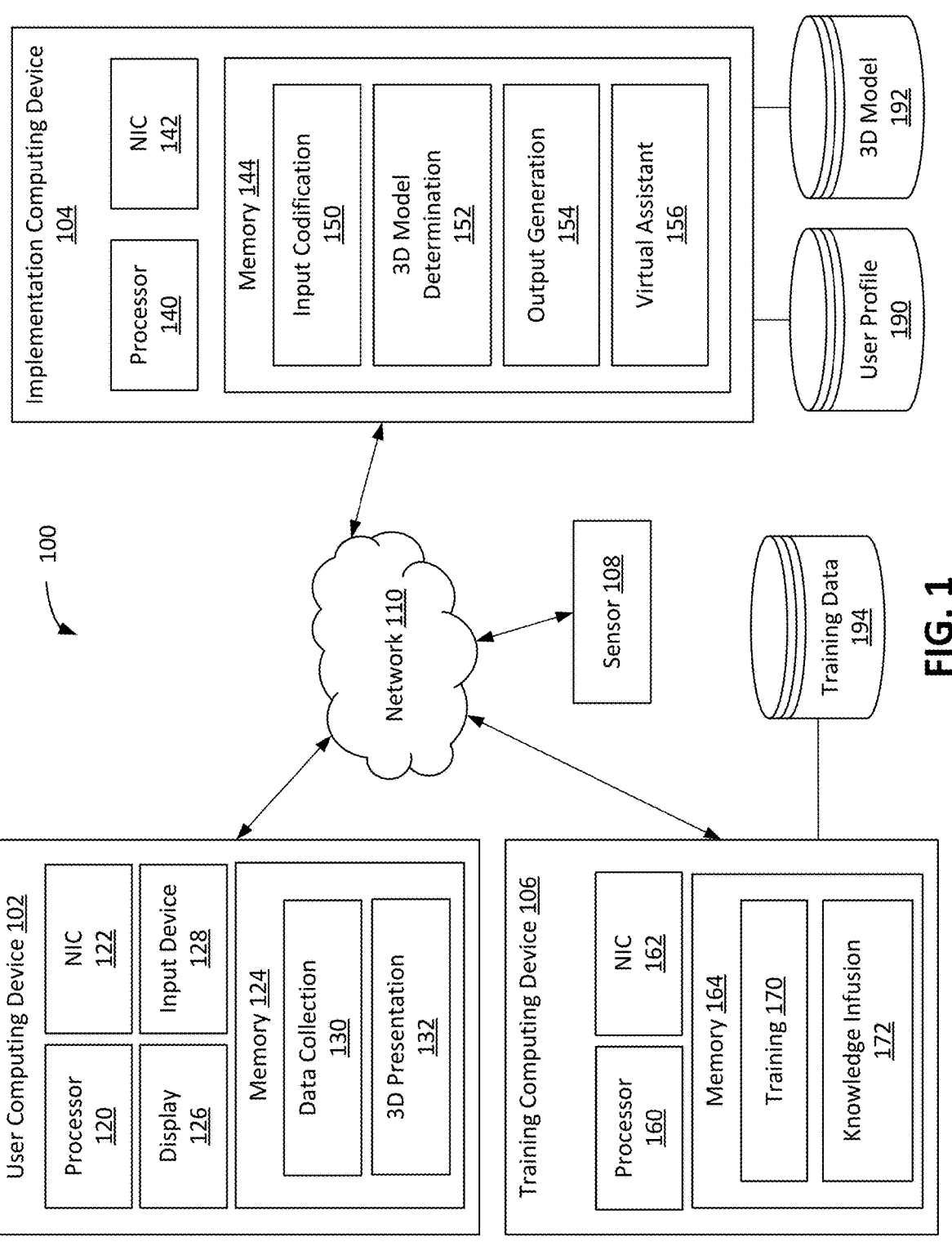
FIG. 1 is a block diagram of an example computing system in which techniques for automatically generating a private metaverse can be implemented, according to some embodiments.

FIG. 1 illustrates an example system 100 in which one or more techniques for generating private metaverse may be implemented. The example system 100 may include a user computing device 102, an implementing computing device 104, a training computing device 106, one or more sensors 108, and a network 110. The user computing device 102, the implementing computing device 104, the training computing device 106, and the one or more sensors 108 may be remote from each other and are communicatively connected via the network 110.

The network 110 may be a single communication network (e.g., the Internet), and in some embodiments also includes one or more additional networks. As just one example, the network 110 may include a cellular network, the Internet, and a server-side local area network (LAN).

The sensor 108 is generally configured to collect data from an event or from a user. The sensor 108 may include a camera, microphone, a gyroscope, etc. Although depicted as one sensor, it should be understood that the sensor 108 may include a plurality of sensors. In some embodiments, a plurality of sensors 108 may coordinate and work together. For example, the implementation computing device 104 may control the a first camera of the plurality of sensors 108 to take a front view picture of an object, a second camera to take a top view picture of the object, and a third camera to take a side view picture of the object.

In some embodiments, the sensor 108 may be configured to extract features or characteristics from the raw data it collects, and instead of transmitting raw data to the implementation computing device 104, the sensor 108 may transmit the extracted features to the implementation computing device 104. In some embodiments, the sensor 108 may be configured to collect data selectively. For example, the sensor 108 may receive messages from the implementation computing device 104 indicating what data are needed. The sensor 108 may, additionally or alternatively to collecting data, extract features from the data, and/or determine whether the data is needed based on the messages. If the sensor 108 determines that the data is not needed, the sensor 108 may refrain from storing the data or transmitting the data to the implementation computing device 104. In some embodiments, the implementation computing device 104 may control the sensor 108 to collect data selectively.

The user computing device 102 is generally configured to present a metaverse to a user and collect data from the user. While FIG. 1 shows only a single user computing device 102, it should be understood that the system 100 may include any suitable number of similar user computing devices operating according to the principles disclosed herein. The user computing device 102 may be or include any stationary, mobile, or portable computing device with wired and/or wireless communication capability (e.g., a smartphone, a tablet computer, a laptop computer, a desktop computer, a smart wearable device such as VR glasses or a smart watch, a vehicle head unit computer, etc.). In the example embodiment of FIG. 1, the user computing device 102 includes a processor 120, a network interface 122, and memory 124. The user computing device 102 further includes or is associated with a display 126 and an input device 128.

The processor 120 may be a single processor (e.g., a central processing unit (CPU)), or may include a set of processors (e.g., multiple CPUs, or one or more CPUs and one or more graphics processing units (GPUs)). Although the display 126 is depicted as part of the user computing device 102, it should be understood that the display 126 may be external to the user computing device 102 and communicatively connected to the user computing device 102 with wires and/or the network 110.

The display 126 may include hardware, firmware, and/or software configured to enable a user to view visual outputs of the user computing device 102, and may use any suitable display technology (e.g., LED, OLED, LCD, etc.). Moreover, in some embodiments where the user computing device 102 is a wearable device, the display 126 may be a transparent viewing component (e.g., lenses of VR glasses) with integrated electronic components. For example, the display 126 may include micro-LED or OLED electronics embedded in lenses of smart glasses.

The input device 128 is capable of receiving inputs from the ambient environment and/or a user, such as a keyboard, a mouse, buttons, keys, a microphone, etc. Further, the input device 128 may be integrated with the display 126 as a touch screen having both input and output capabilities.

The network interface controller (NIC) 122 may include hardware, firmware, and/or software configured to enable the user computing device 102 to exchange electronic data with the implementation computing device 104 via the network 110. For example, the NIC 122 may include a cellular communication transceiver, a Wi-Fi transceiver, and/or transceivers for one or more other wired and/or wireless communication technologies.

The memory 124 may include one or more computer-readable, non-transitory storage units or devices, which may include persistent (e.g., hard disk) and/or non-persistent memory components. The memory 124 may store instructions that are executable by the processor 120 to perform various operations, including the instructions of various software applications and the data generated and/or used by such applications.

In the example embodiment of FIG. 1, the memory 124 may store at least a data collection module 130 and a 3D presentation module 132.

The data collection module 130 may include instructions for collecting data from the user computing device 102. The data may indicate the user's various actions. The user computing device 102 may collect data using the data collection module 130 via various hardware, such as cameras and wearable devices communicatively connected to the user computing device 102.

The 3D presentation module 132 may include instructions for implementing output code received from the implementation computing device 104 present, via the display 126, a metaverse or an object of a metaverse to the user.

While FIG. 1 shows the user computing device 102 as a single component communicating directly (i.e., via network 110) with the implementation computing device 104, in some embodiments the subcomponents of user computing device 102 shown in FIG. 1 are instead divided among two or more user-side devices. For example, a pair of VR glasses may include the processor 120, the memory 124, and the display 126, while a smartphone may include another processing unit, another memory, another display, and the network interface 122. The VR glasses (or smart helmet, etc.) may then communicate as needed with the smartphone (e.g., via Bluetooth) to enable the operations described herein.

The implementation computing device 104 is generally configured to process data associated with an event and generate output code for presenting a metaverse. The implementation computing device 104 may include a processor 140, a network interface controller (NIC) 142, and memory 144. In some embodiments, the implementation computing device 104 may include or communicatively connected to a user profile database 190 and 3D model database 192.

The processor 140 may be a single processor or may include two or more processors. The implementation computing device 104 may include one or more servers, for example, which may reside at a single location or multiple locations. In some embodiments, the implementation computing device 104 may be cloud computing platform.

The NIC 142 may include hardware, firmware, and/or software configured to enable the implementation computing device 104 to exchange electronic data with the user computing device 102 and other, similar user devices via the network 110. For example, the NIC 142 may include a wired or wireless router and a modem.

The memory 144 may be a computer-readable, non-transitory storage unit or device, or collection of units/devices, which may include persistent and/or non-persistent memory components. The memory 144 may store the instructions of an input codification module 150, a 3D model determination module 152, an output generation module 154, and a virtual assistant module 156, each of which may be executed by the processor 140.

Figure 4A:
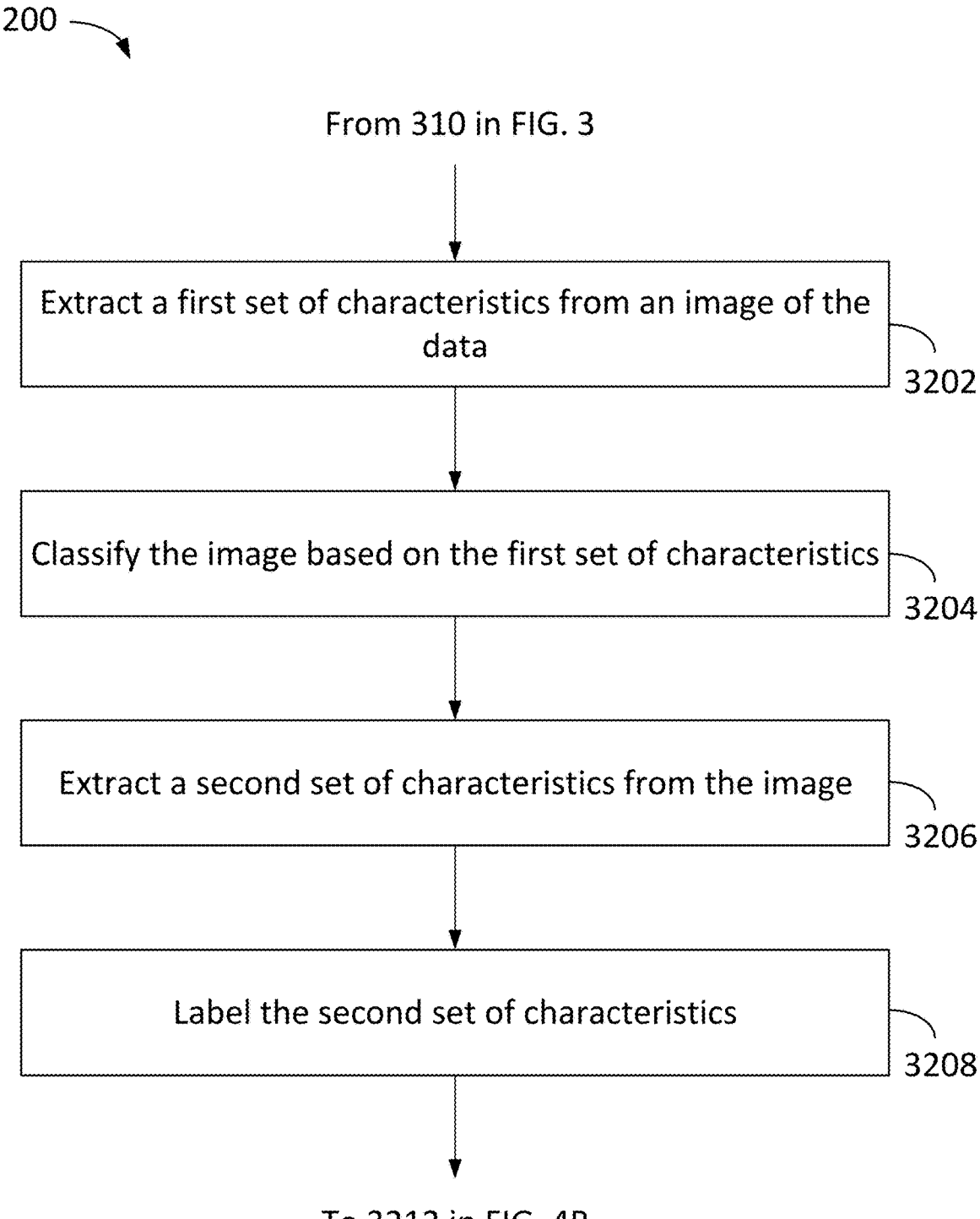
FIG. 4A is an example sequence diagram that illustrates an example method for implementing block 320 of sequence diagram in FIG. 3, according to some embodiments.

The input codification module 150 may include instructions for selecting data, determining whether the data is complete, and/or codifying the data to generate a set of codified input, as will be described below with respect to FIGS. 4A and 4B. The implementation computing device 104 may receive the data from the user computing device 102, the sensor 108, and the user profile database 190. In some embodiments, the input codification module 150 may include a discriminative or generative AI model for determining whether the data is complete for generating a metaverse or an 3D artifact in a metaverse. In some embodiments, the AI model may be a natural language processing (NLP) model. An example inner structure of the AI model will be described below with respect to FIG. 7A.

The 3D model determination module 152 may include instructions for determining 3D model (e.g., selecting a 3D model from the 3D model database 192) for an object and/or modifying the 3D model, as will be described below with respect to FIG. 5. In some embodiments, the 3D model determination module 152 may include a generative AI model for generating a 3D model of an object. An example inner structure of the AI model will be described below with respect to FIG. 7A.

The output generation module 154 may include instructions for generating a set of output code. The set of output are computer-executable instructions that, when executed by one or more processors (such as the processor 120 of the user computing device 102), cause the one or more processors to present a metaverse or a 3D artifact of a metaverse via a display. The details will be described below with respect to block 340 of FIG. 3. In some embodiments, the output generation module 154 may include a generative AI model for generating the output code. An example inner structure of the AI model will be described below with respect to FIG. 7A.

The virtual assistant module 156 may include instructions for generating responses and/or code for visual effects in response to user's questions about the metaverse as described below with respect to FIG. 6B. The virtual assistant module 156 may include a generative AI model (or a chatbot model) to generate the responses and/or code for visual effects. An example inner structure of the generative AI model will be described below with respect to FIG. 7A.

The user profile database 190 stores information associated with users or participants of a particular event. The information may include the user's demographic information such as age, gender, height, weight, etc., the user's pictures, the user's voices, and the user's preferences for his or her virtual images. In some embodiments, the user profile database may include 3D models that the user provided for his or her virtual images.

The 3D model database 192 may include candidate 3D models to be selected for a metaverse. A 3D model is a set of instructions that, when executed by a processor, causes the processor to present a corresponding 3D artifact via a display. The candidate 3D models may be labeled with styles, characteristics, etc., to make the selection more efficient.

The training computing device 106 may be generally configured to train the one or more AI models described above. The training computing device 106 may include a processor 140, a network interface 142, and memory 144. The processor 160 may be configured in a similar manner as described above with respect to the processor 140. The NIC 162 may be configured in a similar manner as described above with respect to the NIC 142. In some embodiments, the training computing device 106 may include or communicatively connected to a training data database 194.

The memory 164 is a computer-readable, non-transitory storage unit or device, or collection of units/devices, that may include persistent and/or non-persistent memory components. The memory 164 may store the instructions of a training module 170 and a knowledge infusion module 172.

The training module 170 may include instructions for training the one or more AI models to be used by the implementation computing device 104. The training computing device 106 may train the AI models using the training data set in the training data database. The details for training an AI model will be described in detail below with respect to FIG. 7B. After the AI models are trained, the implementation computing device 104 may retrieve the trained AI models from the training computing device 106 and use them when needed.

The knowledge infusion module 172 may include instructions for continuously training the one or more AI models described above. For example, the training computing device 106 may continuously train the AI models using data associated with events that occur after the AI models were initially trained. The details for continuously training an AI model will be described in detail below with respect to the knowledge infusion section. After the AI models are continuously trained, the implementation computing device 104 may retrieve the AI models from the training computing device 106 periodically or prior to a new event.

Example Scenarios

Figure 2A:
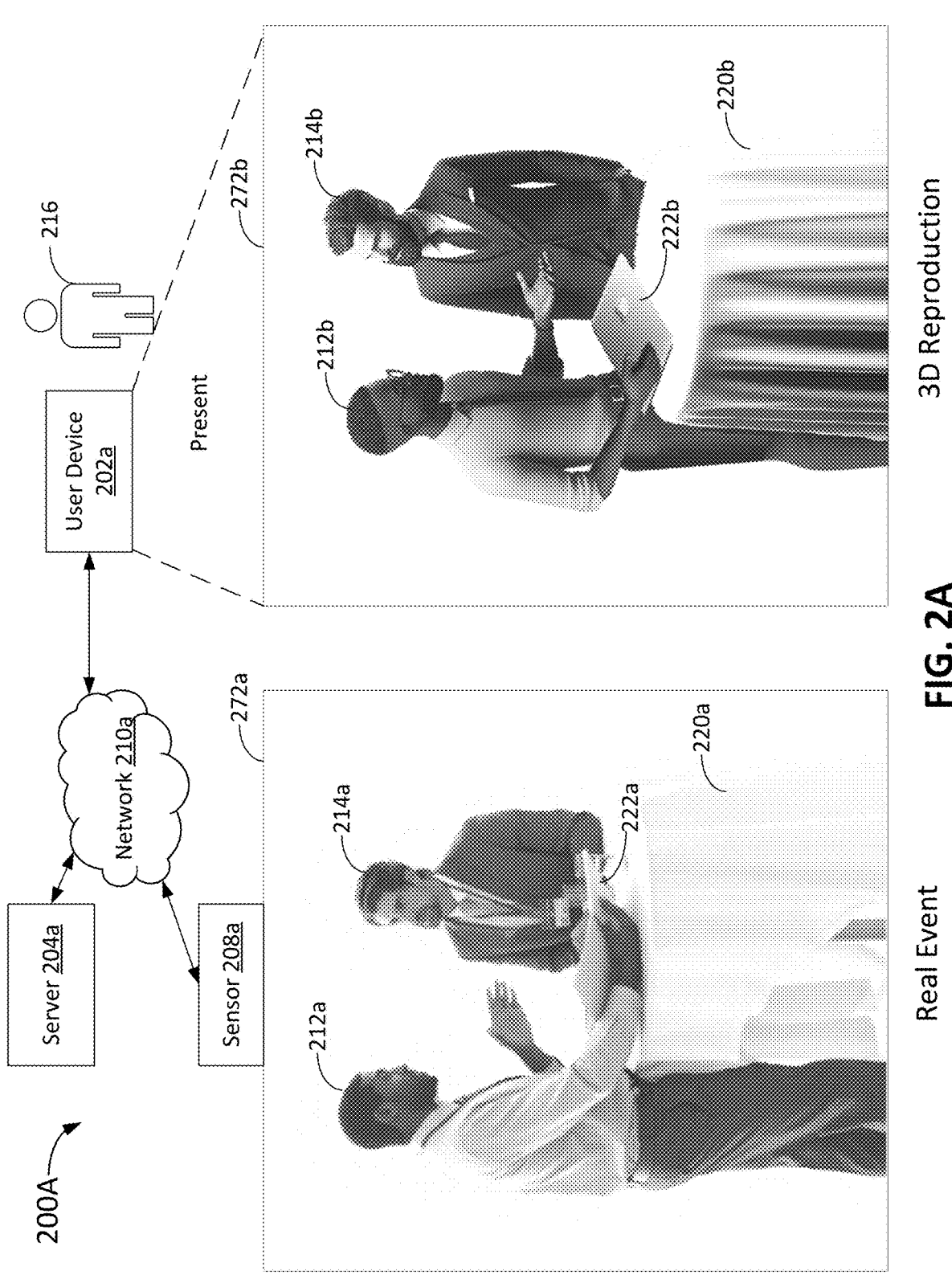
FIG. 2A depicts a first example scenario in which techniques for automatically generating a private metaverse may be implemented, according to some embodiments.

FIG. 2A depicts a first example scenario 200A of implementing the techniques disclosed herein. In the example scenario 200A, a user 216 is observing a particular area 272a of a real event. One or more sensors 208a (such as the one or more sensors 108) are disposed proximate to the property where the real event occurs. The one or more sensors 208a are configured to collect data from at least the particular area 272a. The server 204a (such as the implementation computing device 104) may use the data to generate a set of output code for presenting a 3D reproduction 272b. The user device 202a (such as the user computing device 102) may implement the set of output code from the server 204a to present the 3D reproduction 272b to the user 216.

As depicted, in the particular area 272a of the real event, a first participant 212a is having a conversation with a second participant 214a by a table 220a. The first participant 212a is holding a document folder 222a. The one or more sensors 208a may collect data of objects in the particular area 272a, including the appearance of the first and second participants 212a, 214a, the participants' actions (e.g., facial expressions, hand gestures, standing postures, etc.), the appearance of the table 220a, the appearance of the document folder 222a, and the participants' interactions with the table 220a and the document folder 222a, if any.

Based on the data, the server 204a may generate a first 3D artifact 212b of the first participant 212a and a second 3D artifact 214b of the second participant 214a in a corresponding 3D reproduction 272b. In some embodiments, the system may generate the 3D artifacts 212b, 214b according to certain characteristics of the corresponding of the participants 212a, 214a, respectively. For example, the 3D artifacts 212b, 214b may be in the same gender, having similar skin tones, wearing similar clothing and haircuts as the respective real participants 212a, 214a. Alternatively, a person may choose his or her virtual image. In that case, the server 204a may generate the 3D artifacts 212b, 214b based on the respective person's choices and preferences. In some embodiments, the 3D artifacts 212b, 214b may present similar gestures and facial expressions as the respective real participants 212a, 214a.

The system may generate a third 3D artifact 220b of the table 220a in the 3D reproduction 272b. In some embodiments, the system may generate the third 3D artifact 220b according to certain characteristics of the table 220a. For example, the third 3D artifact 220b may be in a same color, a similar dimension, and with similar decorations as the table 220a. Alternatively, an event holder may set the 3D artifacts of the properties used in the event. The system may generate the third 3D artifact 220b based on the event holder's setting.

The system may generate a fourth 3D artifact 222b of the document folder 222a in a similar manner as described above with respect to generating the third 3D artifact 220b. As depicted, the first participant 212a is interacting with the document folder 222a. The system may alter the fourth artifact 222b based on the interactions. For example, when the first participant 212a moves the document folder 222a, the system may move the fourth 3D artifact 222b accordingly in the 3D reproduction 272b.

Figure 2B:
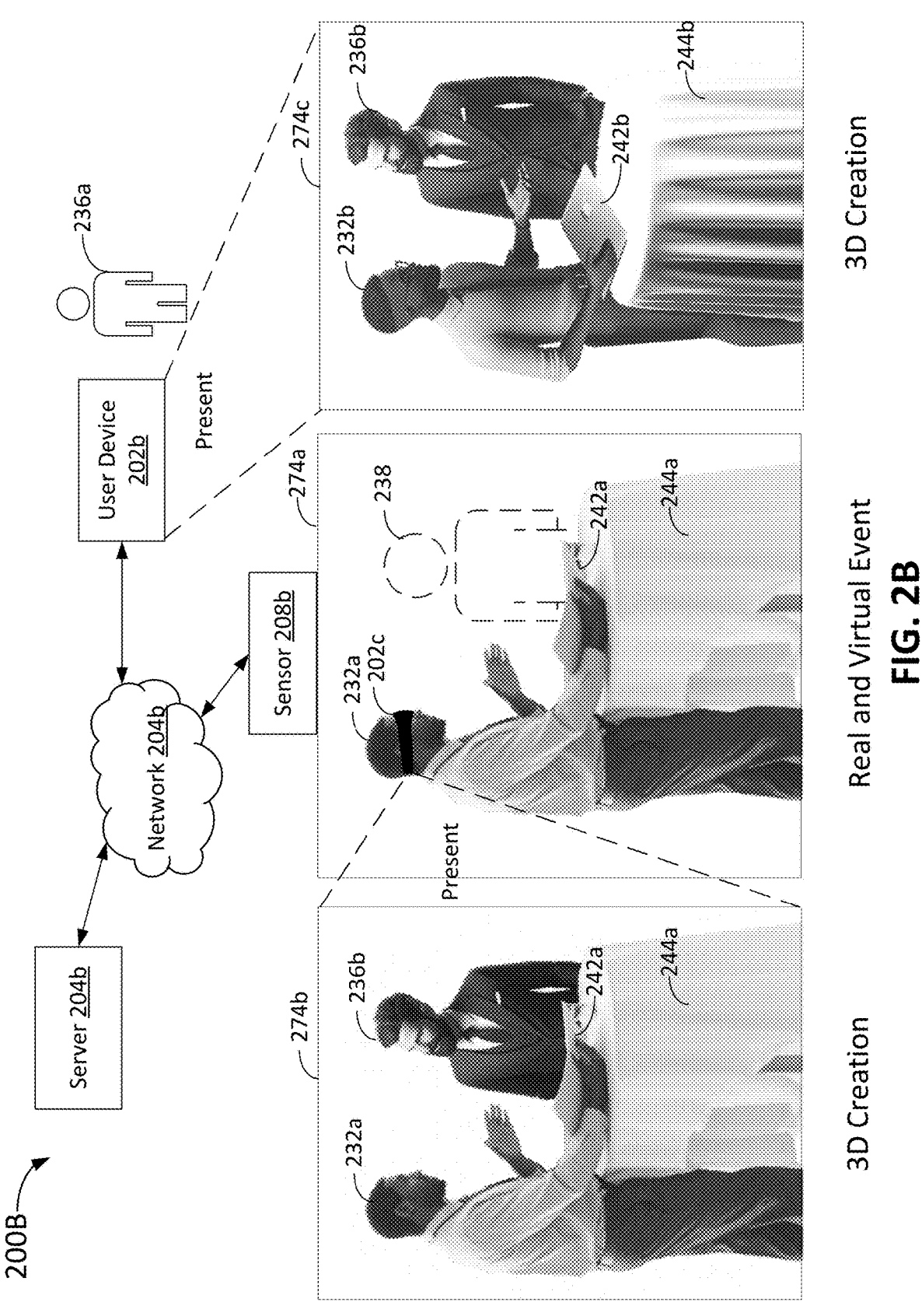
FIG. 2B depicts a second example scenario in which techniques for automatically generating a private metaverse may be implemented, according to some embodiments.

FIG. 2B depicts a second example scenario 200B of implementing the techniques disclosed herein. In the scenario 200B, a first participant 232a attends an event in person and a second participant 236a attends the event virtually.

The first participant 232a may wear a pair of VR glasses 202c (such as the user computing device 102). The VR glasses 202c may be communicatively connected to a server 204b (such as the implementation computing device 104). The second participant 236a may, by interacting with a user device 202b (such as the user computing device 102), control his or her 3D artifact 236b to move the area 238.

The server 204b may, based on the data received from the user device 202b, generate a set of output code for presenting the 3D artifact 236b of the second participant. The VR glasses 202c may implement the set of output code to present the 3D artifact 236b. In this way, the first participant 232a may have an augmented reality experience via the VR glasses 202c, that is, the first participant 232a may see the 3D artifact 236b presented with other real objects, such as the document folder 242a and the table 244a.

Additionally, the server 204b may, based on the data collected from one or more sensors 208b (such as the sensors 108) disposed proximate to the particular area 274a and the data received from the user device 202b, generate a set of output code for presenting 3D artifacts of the event. In this way, the second participant 236a may have a virtual reality experience via the user device 202b, that is, the second participant 236a may see a 3D version of the particular area 274a.

Figure 2C:
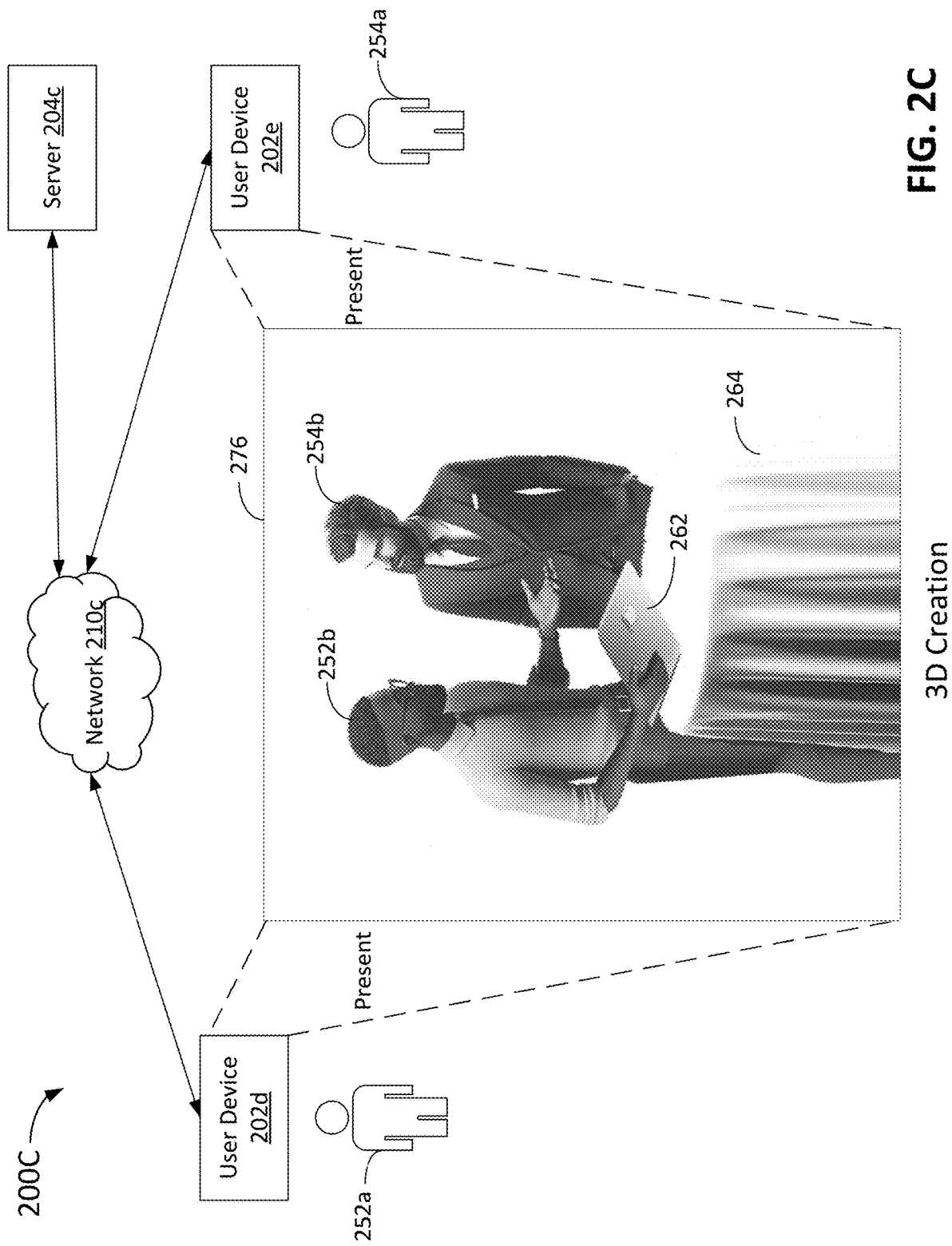
FIG. 2C depicts a second example scenario in which techniques for automatically generating a private metaverse may be implemented, according to some embodiments.

FIG. 2C depicts a third example scenario 200C of implementing the techniques disclosed herein. In the scenario 200C, all participants, including a first participant 252a and a second participant 254b attend an event virtually.

A server 204c (such as the implementation computing device 104) may generate, based on the data from the user devices 202d, 202e (such as the user computing device 102) a set of output code for presenting 3D. The participants 252a, 254a may interact with the 3D artifacts 262, 264 via their respective user devices 202d, 202e if the server 204c determines that the participants 252a, 254a have permission to do so (described below).

In all example scenarios described above, the participant(s) who attend the event virtually may have an experience similar to attending the event on site. More specifically, instead of seeing his or her own corresponding 3D artifacts (such as the 3D artifact 236b), the participant may have a view from the eye position of the 3D artifact, such as the participant may not see his or her own face, but may see 3D artifacts of some part of his or her body, such as hands and feet. Furthermore, the participants may receive sound from the event based on the location of their corresponding 3D artifacts. For example, when the 3D artifact 236b is close to the participant 232a, the participant 236a's user device 202b may output the voice of the participant 232a at a higher volume. Conversely, when the participant 236a controls his or her 3D artifacts to move away from the participant 232a, the participant 236a's user device 202b may still output the voice of the participant 232a, but at a lower volume.

Example Implementation Process

Generating Metaverse

Figure 3:
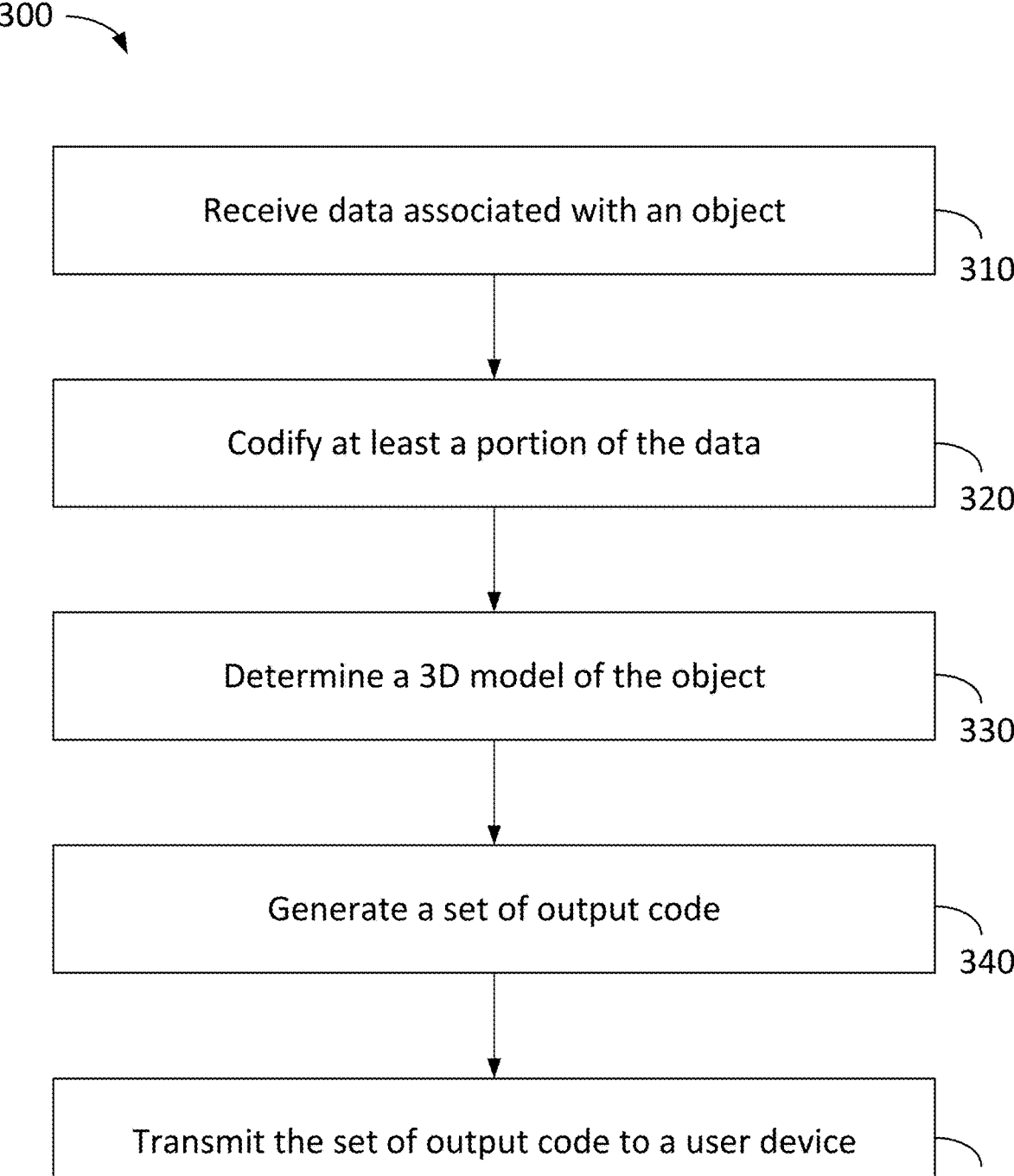
FIG. 3 is an example sequence diagram that illustrates an example method for automatically generating a private metaverse, according to some embodiments.

FIG. 3 is an example sequence diagram 300 that illustrates a method for automatically generating a private metaverse, according to some embodiments. The following describes how the techniques disclosed herein generate a 3D artifact for an object in an event. One will appreciate that generating a plurality of 3D artifacts, in combination, is to generate a metaverse that includes the plurality of 3D artifacts.

At block 310, a server (such as the implementation computing device 104) may receive data associated with an object. As used herein, the term "object" may refer to anything in a real world, including a person (such as the participants 212a, 214a), an animal, a plant, a non-biological object (such as the documents folder 222a and the table 220a), etc.

The data may indicate characteristics of the object and/or a current status of the object. The data indicating characteristics of the object may include pictures of the object captured during a real event by a camera disposed proximate to the real event. The data may also include pictures captured during a past event, collected from the Internet, provided by a hosting entity of the event. The pictures may present various perspectives of the object, such as the outside of the object, and inside of the object. The pictures may also be a blueprint of the object. The data indicating the object's current status may include pictures captured during the real event, sound collected during the real event, and/or videos recorded during the real event.

In some embodiments, the object is a person. In addition to the data described above, the data may also include pictures of the person captured in the past or provided by the user. The data may also include a voice of the person, either captured by a microphone during the event of provided by the person. The data may also include the user's biometric data provided by the person upon his or her consent. The data indicating the person's current status may pictures captured during the real event, voice collected during the real event, and/or videos recorded during the real event.

Additionally or alternatively, the data may include data associated with the event. For example, the data may include the topic of the event, the list of the participants attending the event, the host of the event, the industry of the event, and/or other relevant information.

In some embodiments, the server may select the data based on need and/or quality. For example, the data may include a set of images that are essentially identical. The server a may select one of them and remove the rest of images from the original set of data. As another example, an image may be blurry, and thus the server may remove the image from the original set of data.

In some embodiments, the sensors may collect data based on what information is needed to generate a 3D artifact of an object. For example, if the server needs six views (e.g., front, back, left, right, top, and bottom views) of an object to generate a 3D artifact of the object, a plurality of cameras to adjust their respective angles to capture respective views of the object. The plurality of camera may be preprogramed to do so or be controlled by the server.

At block 320, the server may codify at least a portion of the data to generate a set of codified input associated with the object. FIG. 4A depicts an example sequence diagram 3200 to implement block 320.

In some embodiments, the data associated with the object includes a plurality of images of the object. At block 3202, the server may extract a first set of characteristics from an image of the plurality of images. The first set of characteristics may include key features of the image. For example, the server may have key features of various images stored thereon. When the server recognizes a feature of the image that matches at least one of the stored key features, the server may extract it. For example, for an image showing an outer surface of the object, a key feature may be an outline of the object. As an example, for an image showing an inner structure of the object, the key feature may be shape of typical inner structures of the object. As yet another example, for an image showing a blueprint of an object, the key feature may be typical shapes and line combinations of a blueprint.

At block 3204, the server may classify the image based on the first set of characteristics into one or more categories. The categories may include an outside image of the object, an inside image of the object, and/or a blueprint of the image. For example, the server may extract a key feature that matches a key feature of an outside image, and the server may then determine that the image is an outside image of the object.

At block 3206, the server may extract a second set of characteristics from the image. The second set of characteristics may be features that are needed to generate a 3D artifact corresponding to the object. For example, if a 3D artifact of a building needs to have a similar color and/or shape to the real building, the server may extract the outer color and shape of the building from an outside image of the building. Conversely, if the color of the 3D artifact of the building does not need to be similar to the real building, e.g., based on the event host's preference, the server may refrain from extracting the outer color of the real building. Accordingly, extracting the second set of characteristics may be based on what information is needed (e.g., as indicated by the user) to generate a 3D artifact of the object. When the object is a person, example characteristics needed to generate a corresponding 3D artifact include the person's appearance in various aspects and the person's actions. When the object is a non-person object, example characteristics needed to generate a corresponding 3D artifact include the object's appearance in various aspects and participants' interactions with the object.

At block 3208, the server may label the second set of characteristics. For example, a color extracted from the image may be labeled as "color." As another example, an interaction with an object extracted from an image may be labeled as "interaction." In some embodiments, the server may label the extracted featured based on the category of the image. For example, if the image is an outside image of an object, the server may label the color extracted from the image as outer color.

Figure 4B:
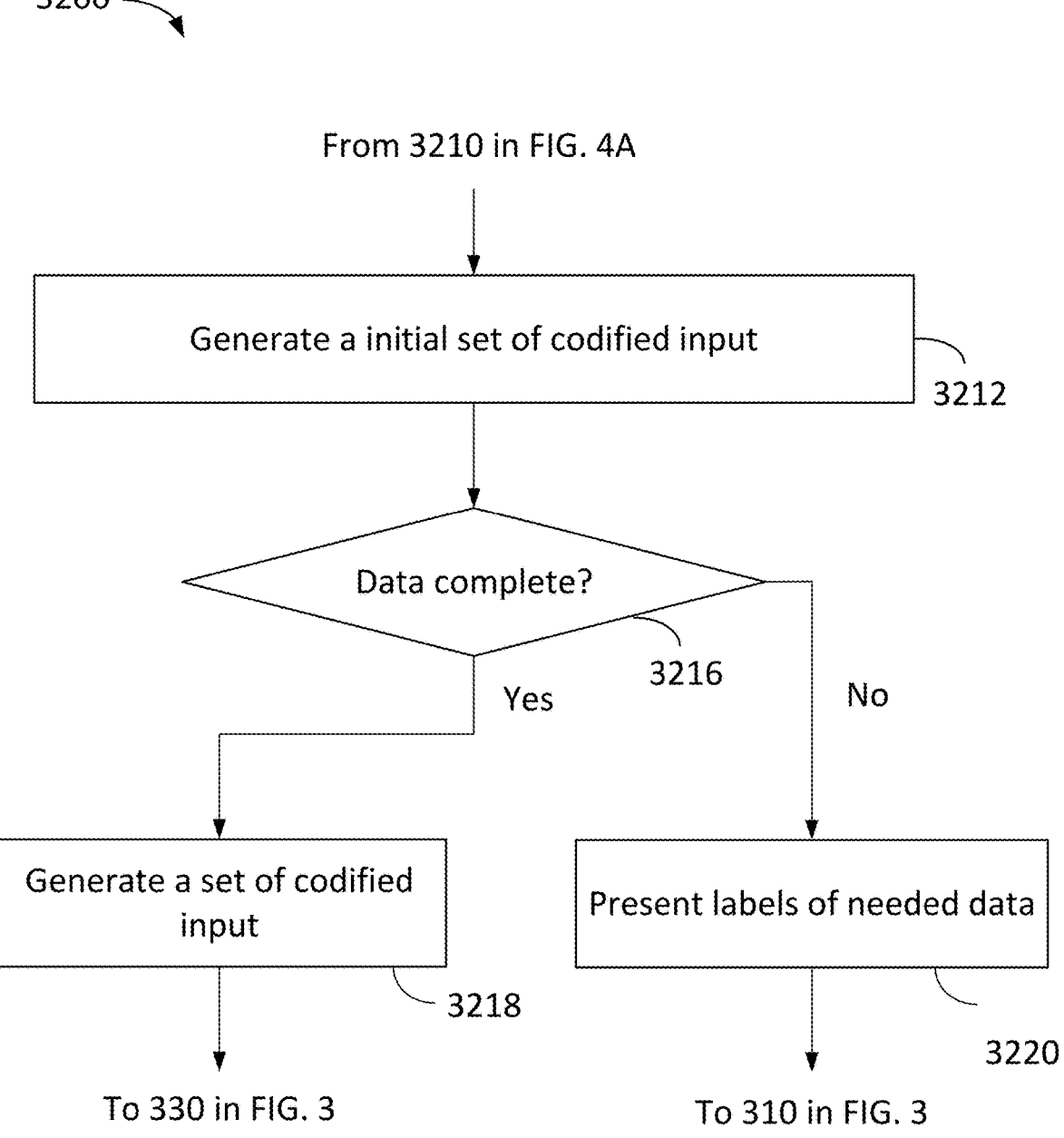
FIG. 4B is an example sequence diagram following the sequence diagram in FIG. 4A, according to some embodiments.

Turning to FIG. 4B, at block 3212, the server may generate an initial set of codified input using at least a portion of the data (e.g., the selected portion of the data as described above). To this end, the server may combine the labeled characteristics to generate the initial set of codified input. For example, the raw data may be a picture of a table. The labeled characteristics extracted from the image may be "table color: RGB (255, 255, 255)" and "table top dimension: radius (20 inch), height (5 inch)." A corresponding codified input may be "table color: RGB (255, 255, 255); table top dimension: radius (20 inch), height (5 inch)." The codified input may be generated based on a set of rules. For example, the rules may dictate that the labels and the values to be connected with an equal symbol rather than parathesis in the example above. Accordingly, the server may generate the codified input as "table color: RGB=(255, 255, 255); table top dimension: radius=20 inch, height=5 inch." As another example, the rules may provide template based on which that the server may generate codified input in a natural language. For example, the codified input may be "The color of the table is RGB (255, 255, 255). The dimension of top portion of the table is radius=20 inch, height=5 inch."

At block 3216, the server may determine whether the data is complete based on the initial set of codified input. To this end, the server may compare the initial set of codified input with a set of target data labels. If a target data label is not found in the initial set of codified input, the server may determine that the data is incomplete. Conversely, if the server finds all target labels in the initial set of codified input, the server may determine that the data is complete. In some embodiments, the server may make the determination by a natural language processing (NLP) model. The NLP model may be trained to "understand" codified input generated according to a set of rules. The NLP model may further be trained to "know" what data are needed based on what the object is. When the NLP model determines the data is complete, it may simply output a "yes" or other symbols or words to indicate such determination. When the NLP model determines that the data is incomplete, in addition to indicating the incompleteness, the NLP model may output the labels of needed data. The server may feed the initial set of codified input to the NLP model and determine whether the data is complete based on the output of the NLP model.

If the server determines that the data is complete, the server may generate a set of codified input based on the initial set of codified input. In some embodiments, the set of codified input to be used in subsequent steps may be identical with the initial set of codified input. In other embodiments, the server may modify the initial set of codified input to generate the set of codified input to be used in subsequent steps, such as changing the format of the codified input to make it easier for further processing.

If the server determines that the data is incomplete, the server may present indications of labels of needed data. If the needed data is to be collected from a user, the server may transmit the indications to a user device to prompt the user to provide such data. Otherwise, the server may present the indications to a host of the event to prompt the host to provide such data. In some embodiments, the server may send executable instructions to the sensors to cause the sensors to collect the needed data.

Referring back to FIG. 3, after generating the codified input, at block 330, the server may determine a 3D model of the object. FIG. 5 depicts an example sequence diagram 3300 to implement block 330 of FIG. 3.

At block 3302, the server may determine a plurality of candidate 3D models based on data associated with the event. For example, the event host may provide data indicating that the event is a professional event. Accordingly, the server may select a set of candidate 3D labeled as professional style. Other types of events may include a casual event, a themed party, etc. When the event is a themed party, the server may select a set of candidate 3D models based on the theme of the party.

At block 3204, the server may select a 3D model from the plurality of candidate 3D models based on the set of codified input. A 3D model is a set of computer-executable instructions that, when executed by a computing device, cause the computing device to present a model. In some embodiments, the server may select a 3D model that matches what the object is. For example, if the object is a table, the server may select a 3D model of a table. In other embodiments, the server may select a 3D model that not only matches what the object is, but also matches at least a portion of the characteristics of the object. For example, if the object is a one-leg table, the server may select a 3D model of a one-leg table, rather than a random type of table. Certain characteristics may be prioritized when the server selects the 3D model. For example, to select a 3D model of table, a shape of 3D model table is prioritized over a color of the model. If the object is a one-leg white table, the server may select one-leg black table over a four-leg white table.

At block 3206, in some embodiments, the server may modify the selected 3D model based on the codified input. For example, if the table is white but there is no white 3D model table among the candidate 3D artifacts, the server may modify a selected a black table to a white table. To this end, the server may modify the instructions of the 3D model that controls the color, and change it from black to white.

In some embodiments, instead of selecting a 3D model and optionally modifying the selected the 3D model, the server may generate a 3D model for the object from scratch. To this end, the server may use a generative artificial intelligence (GAI) model trained for this purpose.

Referring back to FIG. 3, after determining a 3D model of the object, at block 340, the server may generate a set of output code based on the set of codified input, the 3D model, and/or infrastructure as code (IaC). The set of output code is a set of computer-executable instructions that, when executed by a computing device, causes the computing device to present 3D artifact of the object.

The output code may include the code of the 3D model of the object and code for implementing actions or interactions associated with the object. As described above, the data may indicate the object's characteristics and/or a current status. Correspondingly, the codified input generated using the data may include a portion that describes characteristics of the object and a portion that describes a current status of the object. The portions of data may overlap because some data may both describe an object's characteristics and its current status. At block 330, the server may determine a 3D model using the portion of codified input that describes the characteristics of the object. At block 340, the server may generate code that reflects a current status of the object using the portion of codified input that describes the object's current status.

A current status of the object may include the position of the object, the shape of the object, the lighting around the object, etc. In examples where the object is a person, a current status may further include the person's current actions, facial expressions, etc. For example, referring to FIG. 2A, the current status of the document folder 222a may include a current position (e.g., described by its coordinate ranges), a current shape (e.g., partially bended in the middle), and other information (e.g., it is open at a certain page). As another example, the current status of the first participant 212a may include a current standing posture, hand gestures, a voice, and a facial expression.

The server may generate code reflecting the object's current status as part of the output code. Such code may be executed in connection with the code of the 3D model. For example, the code of the 3D model may provide a default shape of a 3D document folder. The code of current status provides a change (e.g., a bent in the middle) to the default shape. When two set of code are executed together, the executing device will present a 3D artifact of a document folder which is slightly bent in the middle.

As indicated above, the output may also include IaC. IaC is a set of code for implementing a process of managing and provisioning computer data center resources through machine-readable definition files, rather than physical hardware configuration or interactive configuration tools. Presenting a virtual event using the techniques disclosed herein requires processing of an enormous amount of data. Configuring IaC dedicated to presenting a virtual event may ensure that the data are passed securely and smoothly among different modules stored on the computing devices, such as the input codification module 150, and the 3D module 152, etc.

The computation for presenting the virtual event may be performed by a cloud computing platform. Typical cloud computing platforms include Amazon Web Services (AWS), Microsoft Azure, and Google Cloud Platform (GCP). Each cloud computing platform may have its own IaC.

The event host may set what cloud computing platform is used for the virtual event. The server may generate IaC for the virtual event using the IaC of the selected platform. To this end, the server may use an AI model trained for this purpose.

Referring back to FIG. 3, after generating the set of output code, at block 350, the server may transmit the set of output code to a user device (such as the user computing device 102). For example, referring to FIG. 2B, in the scenario 200B, the server may transmit the set of output code to the user device 202b. Accordingly, the user device 202b may present the 3D creation 274c to the user 236a. Likewise, the server may transmit a different set of output code generated in a similar manner to the user device 202c. The user device 202c may present the 3D creation 274b to the participant 232a.

Figure 5:
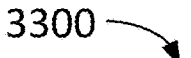
FIG. 5 is an example sequence diagram that illustrates an example method for implementing block 330 of sequence diagram in FIG. 3, according to some embodiments.

One will appreciate that some blocks of FIGS. 3-5 may not be performed in some embodiments of the techniques disclosed herein, and the blocks do not need to be performed in the order depicted in the figures.

Privacy of Metaverse

Figure 6A:
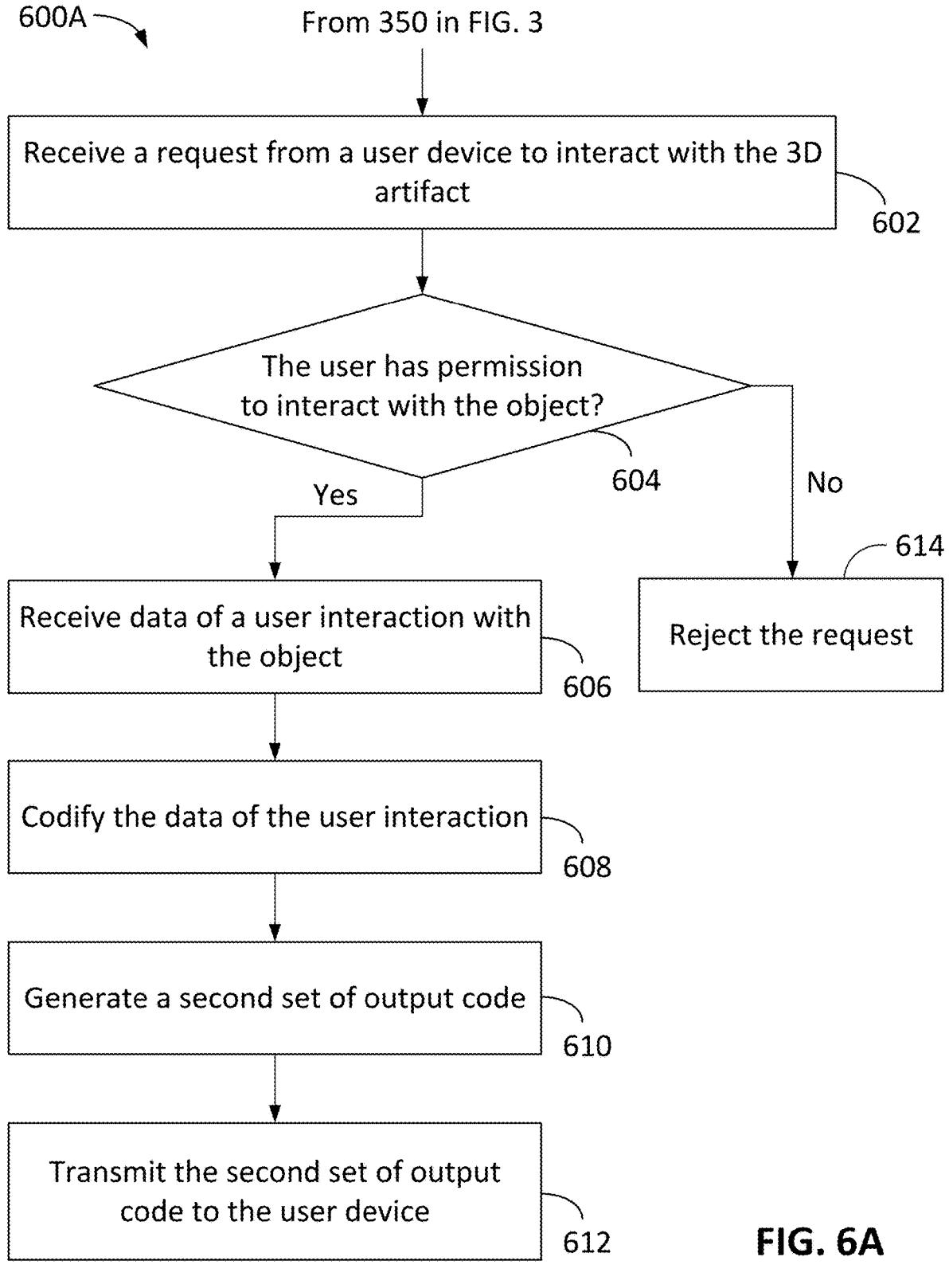
FIG. 6A is an example sequence diagram following the sequence diagram in FIG. 3, according to some embodiments.

Referring to FIG. 6A, in a scenario where the event is hosted at least partially virtually (such as the scenarios 200B and 200C), a user attending an event virtually may attempt to interact with an 3D artifact in the event. The steps below describe a method to improve computer security, according to some embodiments.

The user may interact with his or her respective user device to transmit, to the server, the user's attempt to interact with the 3D artifact. For example, the participant 252a may see a 3D artifact 262 of a document folder via the user device 202d. The participant 252a may use his hand to make motions at an area where the 3D artifact 262 is presented in his view. Based on his actions, the user device or other sensors, may determine that the user is attempting to interact with the 3D artifact.

Upon detecting the user's attempt to interact with the 3D artifact, the user device may transmit to the server a request for interacting with the 3D artifact. The request may include data of the attempted interactions, such as data indicating a specific manner that the user is attempting to interact with the 3D artifact (e.g., holding it, moving it, etc.). At block 602, the server may receive the request.

At block 604, the server may determine whether the user has permission to interact with the object. As indicated above, the metaverse disclosed herein is a private metaverse. The system has zero trust to all participants/users. The server may verify that the user has permission before the server allows the user to interact with any 3D artifact of the metaverse.

A user's permission may be preset by the event host. Alternatively or additionally, the server may determine a user's permission based on the user's profile or credentials. The user's permission may be different with respect to different 3D artifacts. For example, all legal participants may have permissions to interact with 3D artifacts of pen and paper in the metaverse, but only a few participants may interact with a 3D artifact of a television. Further, the user's permission with respect to a particular object may change with time or based on conditions. For example, if a participant is invited to speak at a certain time period, the participant may have permission to interact with a 3D artifact of a microphone only in that time period.

At block 614, if the server determines that the user does not have permission to interact with 3D artifact, the server may reject the user's request. The server may ignore further data from the user device that indicates the user's attempted interactions with the 3D artifact.

At block 606, if the server determines that the user has permission to interact with the 3D artifact, the server may receive and process the data indicating the user's attempted interaction with the 3D artifact. The data may be images of the user's motions, or data extracted from the user's motions, such as data indicating the position and gesture of the user's hands.

At block 608, the server may codify the data of the user's attempted interaction to generate a second set of codified input in a similar manner as described above with respect to block 320.

At block 610, the server may generate a second set of output code based on the second set of codified input. To this end, the server may calculate how the user's motions change the status of the object. The server may then generate the second set of output implementing the changes of the statues in a similar manner as described above with respect to block 340.

At block 612, the server may transmit the second set of output to the user device to cause the user device to present the user's interactions with the 3D artifacts. The server may transmit to other user devices the second set of output code or a different set of output code generated similarly, such as other users may see the user's interactions with the 3D artifact via their respective user devices.

In some embodiments, the server may cause a real object of the 3D artifact to change its status. For example, referring back to FIG. 2B, if the user 236a attempts to interact with 3D artifact of a real television in the event and has the permission to do so, the server may control the real television to respond accordingly. For example, the user may attempt to change channel of the TV by interacting with the 3D artifact of the TV, the server may control the TV to change channels accordingly. To this end, the techniques of Internet of Things (IoT) may be used.

One will appreciate that some blocks of FIG. 6A may not be performed in some embodiments of the techniques disclosed herein, and the blocks do not need to be performed in the order depicted in the figures.

Virtual Assistant

Figure 6B:
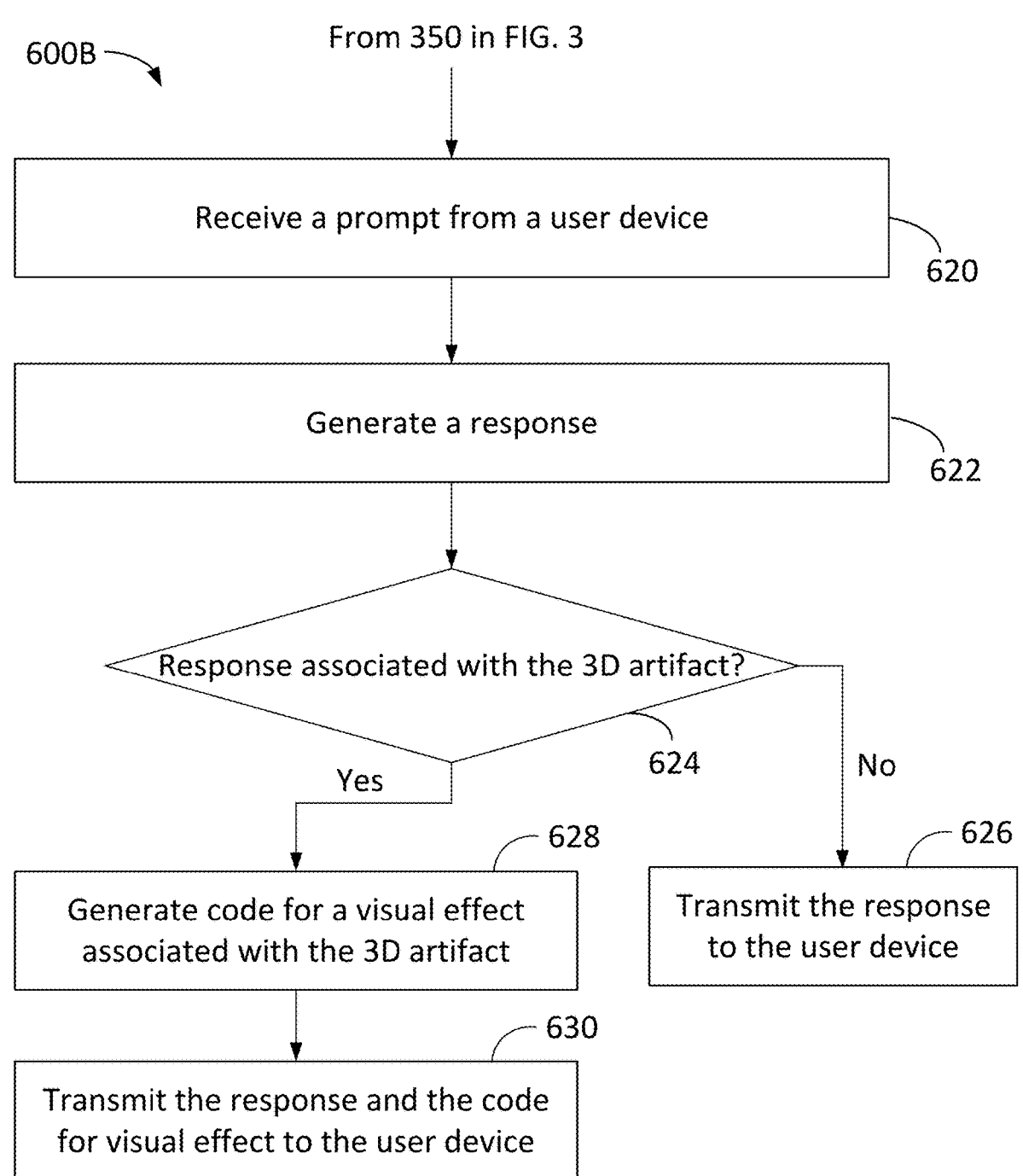
FIG. 6B is an example sequence diagram following the sequence diagram in FIG. 3, according to some embodiments.

Referring to FIG. 6B, in some embodiments, the system may provide a virtual assistant to help the user to interact with the metaverse.

After the system presents the metaverse to a user, the user may have questions about how to interact with the metaverse. For example, the user may ask a question about the metaverse, e.g., via a prompt. At block 620, a server (such as the implementation computing device 104) may receive the prompt from the user's user device (such as the user computing device 102).

At block 622, the server may generate a response to the prompt. To this end, the server may use an AI model (such as a chatbot) trained to answer user's questions about a metaverse.

At block 624, the server may determine whether the response is associated with a 3D artifact. For example, the user may ask a general question about the metaverse, such as how to walk in the metaverse. A response to such a question may or may not be associated with any particular 3D artifact. The response may be "you can walk in a real world, and you will be walking in the metaverse simultaneously." As another example, the user may ask a question that may involve a specific object, such as "where can I find a TV?" The server may determine that the response is associated with a 3D artifact for a TV.

At block 626, if the server determines that the response is not associated with any 3D artifacts, the server may transmit the response to the user device. The user device may present the response to the user visually or audibly.

At block 628, if the server determines that the response is associated with a particular 3D artifact, the server may generate a set of output code for a visual effect associated with the particular 3D artifact.

At block 630, the server may transmit the response and the code for the visual effect to the user device. The user device may implement the code to present the visual effect to the user simultaneously as the user device presents the response to the user. An example visual effect may be showing a virtual arrow to the 3D artifact of the TV so that the user can easily find it.

One will appreciate that some blocks of FIG. 6B may not be performed in some embodiments of the techniques disclosed herein, and the blocks do not need to be performed in the order depicted in the figures.

Example AI Model

As indicated above, the server may use AI models to determine whether the data is complete, to generate 3D models, to generate IaC for a particular metaverse, to generate the output code, etc.

Figure 7A:
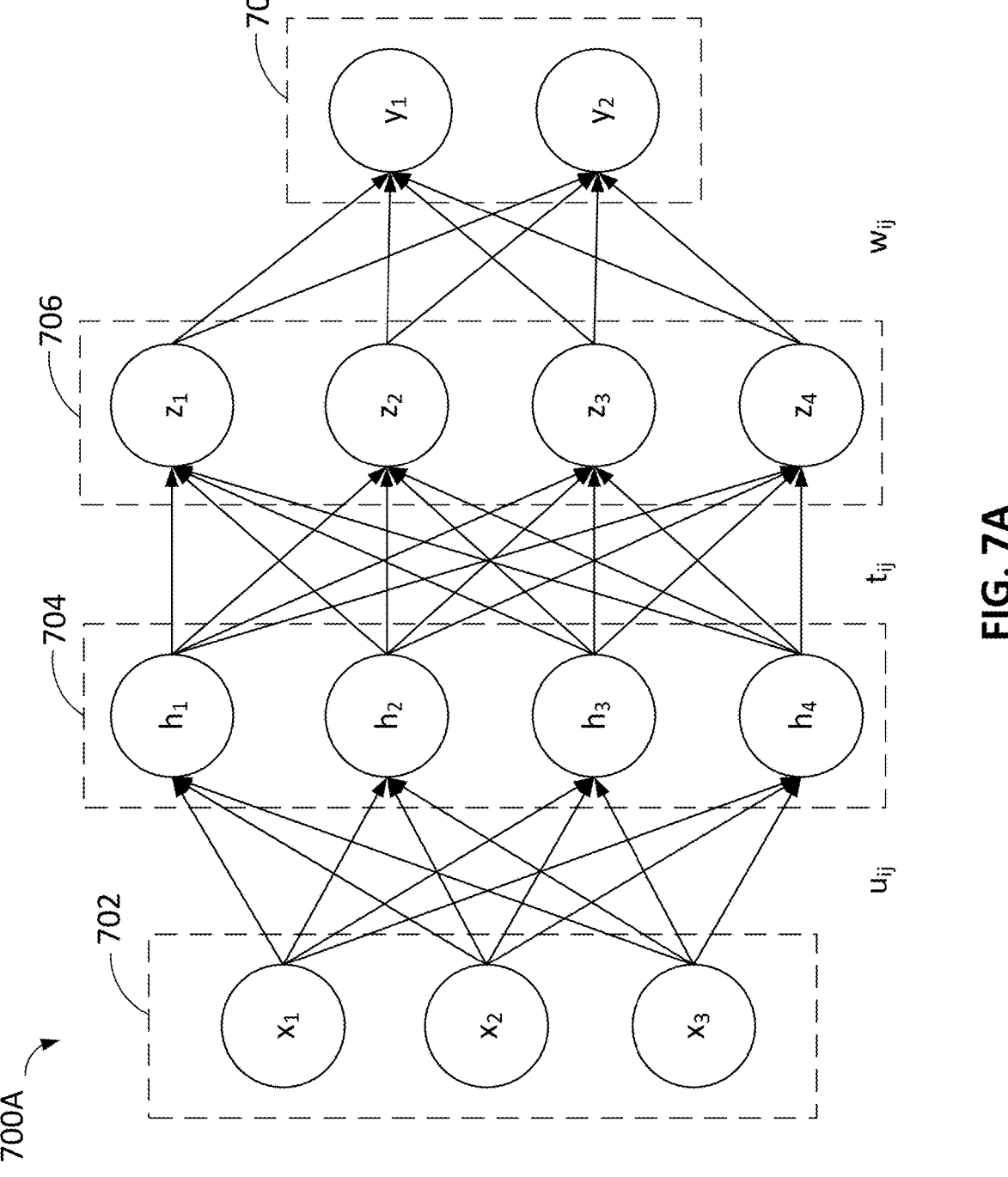
FIG. 7A depicts an example structure of an example artificial intelligence (AI) model, according to some embodiments.

FIG. 7A depicts a structure of an artificial neural network (ANN) AI model 700A, as an example of the AI model disclosed herein. It should be understood, however, that by including position embeddings into input dataset and configure the neurons in a certain manner, the neural network AI model 600 may be a transformer model. After appropriate training, the neural network AI model 600 may be a generative pretrained transformer (GPT) model. One will appreciate other appropriate models may be used, including but not limited to Naïve Bayes, Linear Regression, Logistic Regression, Support Vector Machine, etc.

The ANN model 700A having an input layer 702, one or more intermediate layers 704, 706, and an output layer 708. Each of the layers in the ANN may include an arbitrary number of neurons $x_1$-$y_2$. The plurality of layers may chain neurons together linearly and may pass output from one neuron to the next, or may be networked together such that the neurons communicate input and output in a non-linear way. For example, each of the neurons $h_1$-$h_4$ may be a weighted sum of $x_1$-$x_3$, i.e., $$h_j = \sum_{i=1}^{n} u_{ij} x_1, \, j = 1, 2, \dots, m$$

where for the ANN model 700A, n=3, and m=4.

In general, it should be understood that many configurations and/or connections of ANNs are possible. In an embodiment, the input layer may correspond to vectorized input. For example, to train the AI model (or NLP model) to determine whether the data is complete, the server may convert the initial set of codified input to a set of vectors, such as $(x_1, \dots, x_n)$. The vector may describe mathematically the labels and characters included in the codified input.

Each of the values may be an input corresponding to a respective neuron in the input layer 702.

The input layer may correspond to a large number of input values (e.g., one million inputs), in some embodiments, and may be analyzed serially or in parallel. Further, various neurons and/or neuron connections within the ANN may be initialized with any number of weights (such as the weights $u_{ij}$, $t_{ij}$, and $w_{ij}$). Each of the neurons in the intermediate layers 704, 706 may analyze one or more of the input parameters from the input layer, and/or one or more outputs from a previous one or more of the intermediate layers, to generate a decision or other output.

The output layer 708 may include one or more outputs, each indicating a respective determination. For example, if the AI model is the model for determining whether the data is complete, the output neuron $y_1$ may be a numerical value indicating whether the data is complete, such as $y_1=1$ indicates completeness, and $y_1=0$ indicates incompleteness. The output neuron $y_2$ may be a vector indicating a label of needed data. The server may convert the vector to its corresponding words or phrase, which constitutes the label.

Example Training Process

Figure 7B:
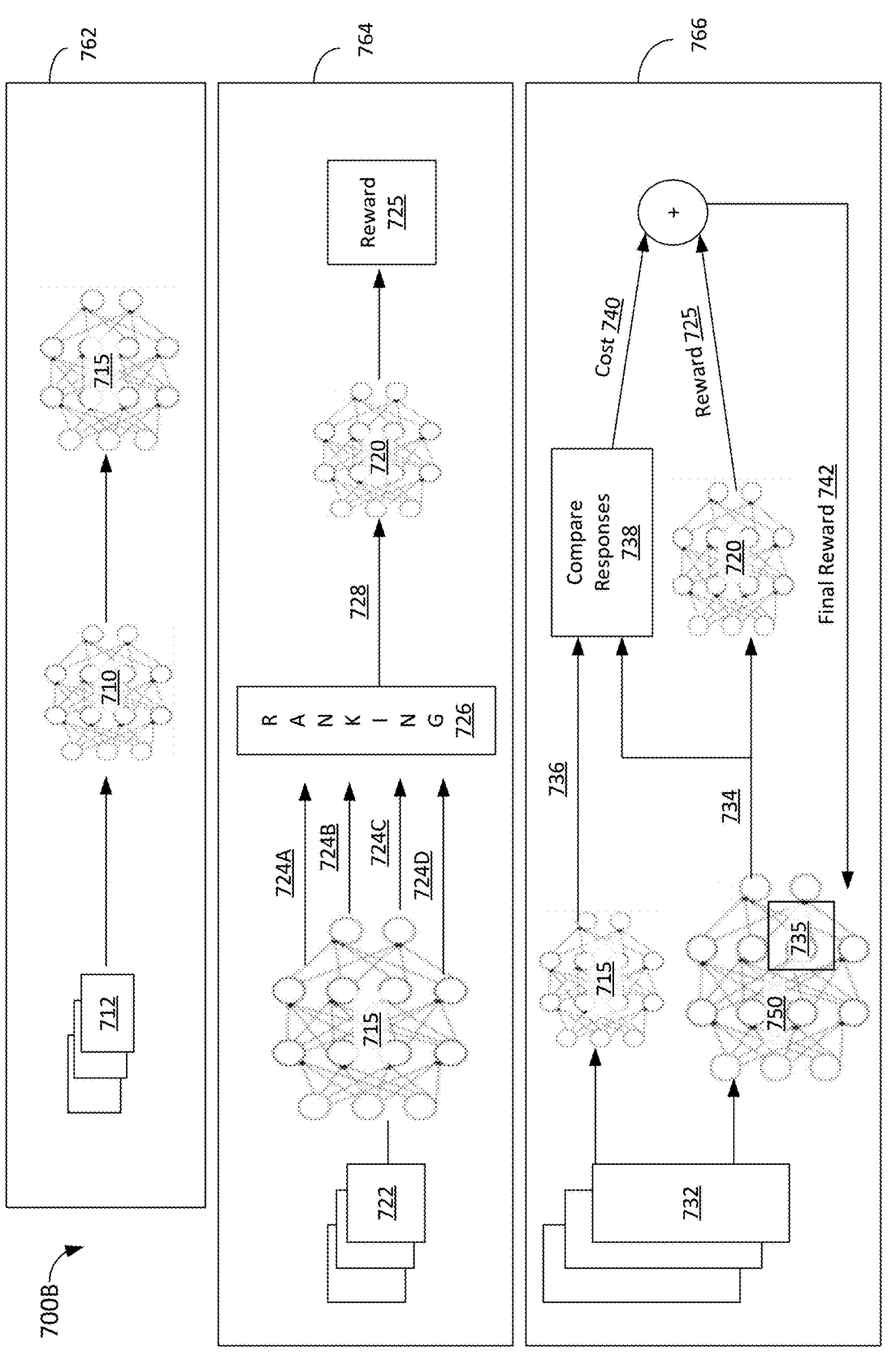
FIG. 7B depicts an example process of training an example AI model, according to some embodiments.

FIG. 7B depicts an example process for training the ANN AI model 700A of FIG. 7A. One will appreciate other appropriate training techniques may be used. Some of the blocks in FIG. 2 may represent hardware and/or software components, other blocks may represent data structures or memory storing these data structures, registers, or state variables (e.g., 712), and other blocks may represent output data (e.g., 725). Input and/or output signals may be represented by arrows labeled with corresponding signal names and/or other identifiers.

The system and methods to generate and/or train an AI model (e.g., via the training module 180 of the training computing device 106), may consist of three stages: (1) a supervised training step, at which stage the AI model may represent a cursory model for what may be later developed and/or configured as the AI model; (2) a reward model step where human labelers may rank numerous AI model outputs to evaluate the output which best mimic preferred human output, generating comparison data, and be trained with on the comparison data; and/or (3) a policy optimization step in which the reward model may further improve the AI model. In one aspect, step one may take place only once, while steps two and three may be iterated continuously, e.g., more comparison data is collected on the current AI model, which may be used to optimize/update the reward model and/or further optimize/update the policy.

In some embodiments, an AI model may be pretrained before it undergoes the training stages (1)-(3) above. For example, an AI model for the virtual assistant may be pretrained with a corpus of documents including human conversations. In the pretraining stage, the AI model may be required to predict a masked portion of a sentence, and adjust its parameters based on the difference between its predictions and the portion of the sentence that was under mask in a similar manner as described below with respect to the supervised training stage.

Supervised Training

In a first training stage 762, a training server (such as the training computing device 106) may train an AI model (such as the AI model 700A) using supervised learning techniques. This training stage is described below with reference to both FIGS. 7A and 7B.

Using the ANN model 700A in FIG. 7A as an example, the weights $u_{ij}$, $t_{ij}$, and $w_{ij}$ are parameters of the model. One will appreciate that the AI model may include other parameters. For example, if $z_i$ is calculated using $h_i$ based on the weights $t_{ij}$ and other parameters, such other parameters are also parameters of the ANN model 700A.

When the training server trains the ANN model 700A, the training server updates the weights $u_{ij}$, $t_{ij}$, $w_{ij}$ and optionally other parameters iteratively. While training, the training server may feed the ANN model 700A (corresponding to the model 710 in FIG. 7B) with a plurality of sets of codified input for training and determination results associated with a respective set of the codified input for training, which is the training dataset 712 in FIG. 7B. The ANN model 700A may receive a set of codified input for training at the input layer 702. The ANN model 700A may determine a set of output $y_1$ and $y_2$ using a set of randomly (or otherwise) initialized parameters $u_{ij}$, $t_{ij}$, and $w_{ij}$. The ANN model 700A may compute a change to the parameters $u_{ij}$, $t_{ij}$, and $w_{ij}$ based on differences between the output $y_1$ and $y_2$ and a set of output associated with the set of codified input for training. The change may be proportional to the differences. For example, when the differences are greater, the changes to the parameters $u_{ij}$, $t_{ij}$, and $w_{ij}$ are greater.

Upon the parameters $u_{ij}$, $t_{ij}$, and $w_{ij}$ converging to a certain range, that is, the changes to the parameters are smaller than a predetermined threshold, the AI model 700A may be determined to be ready for use or for further training as described below (corresponding to the model 715 in FIG. 7B).

The AI models for generating 3D models, generating IaC for a particular metaverse, generating the output code may be trained in a similar manner. To train the AI model for generating 3D models, the training data may be, for example, a plurality of sets of codified input for training and code for 3D models associated with the respective set of codified input. To train the AI model for generating IaC for a particular metaverse, the training data may include a set(s) of IaC for various cloud computing platforms and IaC for metaverse associated with each respective set of the IaC for various cloud computing platforms. To train the AI for generating the output code, the training data may include a plurality of codified input sets, 3D models, and IaC, and a plurality of output code sets, each associated with a respective set of codified input, 3D models, and IaC. To train the AI model for the virtual assistant, the training data may include a plurality of prompts (e.g., questions about a metaverse) and a plurality of responses including code for visual effects associated with a respective prompt.

Training Reward Model

In a second training stage 764, the training server may train a reward model using human feedback. The training server may train a reward model 720 to provide, as an output, a scaler value/reward 725. The reward model 720 may be required to leverage Reinforcement Learning with Human Feedback (RLHF) in which a model (e.g., AI model 750) learns to produce outputs which maximize its reward 725, and in doing so may provide output which are better aligned to inputs.

Training the reward model 720 may include the training server providing an input for training 722. This input may be different from the training dataset described above. For example, to train the AI model to determine whether the data is complete, in this training stage, the input for training may include codified input for training, but not include the information of whether the codified input is complete. Similarly, the AI model for generating 3D models in the second training stage 764, the training data may be a plurality of codified input sets for training, but not include the code for 3D models associated with such codified input.

To train the AI model for generating IaC for a particular metaverse in the second training stage 764, the training data may include a plural set of IaC for various cloud computing platforms, but not include IaC for metaverse associated with each respective set of the IaC for various cloud computing platforms. To train the AI for generating the output code in the second training stage 764, the training data may include a plurality of codified input sets, 3D models, and IaC, and but not include a plurality of output code sets each associated with a respective set of codified input, 3D models, and IaC. To train the AI for the virtual assistant in the second training stage 764, the training data may include a plurality of prompts, and but not include a plurality of responses or code for visual effects associated with the prompts. Additionally or alternatively, the training dataset used in the second stage 764 may be the data not seen by the AI model when it is trained in the first stage 762.

Based on the input for training 722, the AI model 715 may generate various outputs 724A, 724B, 724C, and 724D. The training server may present the output 724A, 724B, 724C, and 724D to a user interface device, such as a display (e.g., as text or graphical output), a speaker (e.g., as audio/voice output), and/or any other suitable manner of output of the output 724A, 724B, 724C, and 724D for review by the data labelers.

The data labelers may provide feedback via the training server on the output 724A, 724B, 724C, and 724D when ranking 726 them from best to worst based on the input-output pairs. The data labelers may rank 726 the output 724A, 724B, 724C, and 724D by labeling the associated data. The ranked input-output pairs 728 may be used to train the reward model 720. The reward model 720 may provide as an output the scalar reward 725.

The scalar reward 725 may include a value numerically representing a human preference for the best and/or most expected output to an input. For example, inputting the "winning" input-output pair data to the reward model 720 may generate a winning reward. Inputting a "losing" input-output pair data to the same reward model 720 may generate a losing reward. The reward model 720 and/or scalar reward 725 may be updated based up labelers ranking 726 additional input-output pairs generated in output to additional inputs 722.

RLHF Training

In a third training stage 766, the training server may optimize the AI model using the reward model trained in the second stage 764.

The training server may train the AI model 750 to generate an output 734 to a random, new and/or previously unknown input 732. To generate the output 734, the AI model 750 may use a policy 735 which it learns during training of the reward model 220, and in doing so may advance from the AI model 715 to the AI model 750. The policy 735 may represent a strategy that the AI model 750 learns to maximize the reward 725. Reflected in the inner structure of the AI model, the policy is implemented as a set of parameter values (e.g., the weights $u_{ij}$, $t_{ij}$, and $w_{ij}$) that allow the AI model to maximize the reward 725. As discussed herein, based upon input-output pairs, a human labeler may continuously provide feedback to assist in determining how well the output of AI model 750 matches expected output to determine the rewards 725. The rewards 725 may feed back into the AI model 750 to evolve the policy 735, i.e., updating the parameters of the AI model. The training server may update the policy 735 as the AI model 750 provides output 734 to additional inputs 732.

In one aspect, the output 734 of the AI model 750 using the policy 735 based upon the reward 725 may be compared using a cost function 738 to the AI model 715 (which may not use a policy) output 736 of the same input 732. The cost function 738 may be trained in a similar manner and/or contemporaneous with the reward model 720. The training server may compute a cost 740 based upon the cost function 738 of the output 734, 736. The cost 740 may reduce the distance between the output 734, 736, i.e., a statistical distance measuring how one probability distribution is different from a second, in one aspect the output 734 of the AI model 750 versus the output 736 of the model 715. Using the cost 740 to reduce the distance between the output 734, 736 may avoid a training server over-optimizing the reward model 720 and deviating too drastically from the human-intended/preferred output. Without the cost 740, the AI model 750 optimizations may result in generating output 734 which are unreasonable but may still result in the reward model 720 outputting a high reward 725.

The output 734 of the AI model 750 using the current policy 735 may be passed by the training server to the reward model 720, which may return the scalar reward 725. The AI model 750 output 734 may be compared via the cost function 738 to the AI model 715 output 736 by the training server to compute the cost 740. The training server may generate a final reward 742 which may include the scalar reward 725 offset and/or restricted by the cost 740. The final reward 742 may be provided by the training server to the AI model 750 and may update the policy 735, which in turn may improve the functionality of the AI model 750.

Knowledge Infusion

In some embodiments, the training server may use data collected from an event and the output code for producing a metaverse for the event to continuously train the AI models described above. For example, the training computing device 106 may receive data of an event from the user computing device 102 and the sensor 108, and output code associated with the event from the implementation computing device 104 and use them to continuously train the AI models used in the techniques disclosed herein.

Such knowledge infusion may occur in various stages. For example, the training server may receive codified input and corresponding determination of whether the data is complete and use the data to continuously train the AI model for determining whether the data is complete. As another example, the training server may receive codified input and corresponding 3D models and use them to continuously train the AI model for generating 3D models.

To implement the continuous training, the training server may add the new training data (e.g., data of an event and output code associated with the event) to the training dataset. The training server may use the particular new training data to further train the AI models for one more iteration. Alternatively, the training server may, after receiving a considerable amount of new input for training, retrain the AI model using the entire training dataset including the new inputs. In some embodiments, the training server may remove old training data periodically to make sure the training data meets users' up-to-date needs. The new training data may be used to train the AI models in any of the training stages 762-766 described above.

In this way, as the implementing server successfully produces a more private and secure metaverse, the training server receives more training data from the implementing server and continuously update the AI models. The AI models are thus improved continuously and may meet changing needs from users.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one embodiment" or "an embodiment" means that a particular element, feature, structure, or characteristic described in connection with the embodiment is included in at least one embodiment or embodiment. The appearances of the phrase "in one embodiment" in various places in the specification are not necessarily all referring to the same embodiment.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "of" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for generating private metaverse through the principles described herein. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method for generating a metaverse for an event, implemented by one or more processors, comprising:
receiving data associated with an object associated with the event, the data including a plurality of images associated with the object;

codifying at least a portion of the data to generate a set of codified input associated with the object, including:

for each image of the plurality of images:

extracting a first set of characteristics from the image;

classifying the image into at least one category of a plurality of categories based on the first set of characteristics;

extracting a second set of characteristics from the image based on the at least one category; and labeling the second set of characteristics based on the at least one category; and generating the set of codified input using labeled characteristics of the plurality of images;

determining a three-dimensional (3D) model of the object based on the set of codified input;

generating a set of output code based on the set of codified input, the 3D model, and infrastructure as code; and transmitting, to a user device, the set of output code to cause the user device to present a 3D artifact in the metaverse corresponding to the object.

2. The method of claim 1, wherein a first portion of the set of codified input corresponds to characteristics of the object, and a second portion of the set of codified input corresponds to a status of the object, wherein determining the 3D model based on the data associated with the object includes:

selecting, from a plurality of candidate 3D models, the 3D model based on the first portion of the set of codified input.

3. The method of claim 2, wherein the data associated with the object includes data of the event associated with the object, the method further comprising:

determining the plurality of candidate 3D models based on the data of the event.

4. The method of claim 1, further comprising:

generating the infrastructure as code based on a cloud computing platform for generating the metaverse.

5. The method of claim 1, wherein generating a set of output code is performed by an artificial intelligence (AI) model, the AI model including a set of parameters, and the method further includes training the AI model by:

collecting data associated with past events; and iteratively adjusting at least one respective set of parameters of the AI model based on the data associated with past events.

6. The method of claim 5, further comprising:

updating the AI model by adjusting at least one respective set of parameters based on at least one of data associated with the event, the set of codified input, the 3D model, the infrastructure as code, or the set of output code.

7. A method for generating a metaverse for an event, implemented by one or more processors, comprising:

receiving data associated with an object associated with the event;

codifying at least a portion of the data to generate a set of codified input associated with the object;

determining a three-dimensional (3D) model of the object based on the set of codified input;

generating a set of output code based on the set of codified input, the 3D model, and infrastructure as code;

transmitting, to a user device, the set of output code to cause the user device to present a 3D artifact in the metaverse corresponding to the object;

generating an initial set of codified input using the data associated with the object;

comparing the initial set of codified input with a set of target data labels to determine labels of needed data; and presenting an indication of the labels of needed data to a user.

8. The method of claim 7, wherein the data associated with the object comprises a first set of data, and wherein generating the set of codified input includes:

selecting a second set of data from the first set of data based on the labels of needed data; and generating the set of codified input associated with the object using the second set of data.

9. The method of claim 7, wherein a first portion of the set of codified input corresponds to characteristics of the object, and a second portion of the set of codified input corresponds to a status of the object, wherein determining the 3D model based on the data associated with the object includes:

selecting, from a plurality of candidate 3D models, the 3D model based on the first portion of the set of codified input.

10. The method of claim 9, wherein the data associated with the object includes data of the event associated with the object, the method further comprising:

determining the plurality of candidate 3D models based on the data of the event.

11. The method of claim 7, further comprising:

generating the infrastructure as code based on a cloud computing platform for generating the metaverse.

12. The method of claim 7, wherein generating a set of output code is performed by an artificial intelligence (AI) model, the AI model including a set of parameters, and the method further includes training the AI model by:

collecting data associated with past events; and iteratively adjusting at least one respective set of parameters of the AI model based on the data associated with past events.

13. The method of claim 12, further comprising:

updating the AI model by adjusting at least one respective set of parameters based on at least one of data associated with the event, the set of codified input, the 3D model, the infrastructure as code, or the set of output code.

14. A method for generating a metaverse for an event, implemented by one or more processors, comprising:

receiving data associated with an object associated with the event;

codifying at least a portion of the data to generate a set of codified input associated with the object;

determining a three-dimensional (3D) model of the object based on the set of codified input;

generating a set of output code based on the set of codified input, the 3D model, and infrastructure as code;

transmitting, to a user device, the set of output code to cause the user device to present a 3D artifact in the metaverse corresponding to the object;

generating an initial set of codified input using the data associated with the object;

comparing the initial set of codified input with a set of target data labels to determine that the data is complete; and generating the set of codified input based on the initial set of codified input.

15. A method for generating a metaverse for an event, implemented by one or more processors, comprising:

receiving data associated with an object associated with the event;

codifying at least a portion of the data to generate a set of codified input associated with the object;

determining a three-dimensional (3D) model of the object based on the set of codified input;

generating a set of output code based on the set of codified input, the 3D model, and infrastructure as code;

transmitting, to a user device, the set of output code to cause the user device to present a 3D artifact in the metaverse corresponding to the object;

receiving a request from a user to interact with the object;

determining that the user has permission to interact with the object;

receiving data of a user interaction with the object;

generating a second set of codified input based on the data of the user interaction;

generating a second set of output code based on the second set of codified input, the 3D model, and the infrastructure as code; and transmitting, to the user device, to cause the user device to implement the second set of output code to present a 3D version of the user interaction in connection with the 3D artifact.

16. The method of claim 15, wherein a first portion of the set of codified input corresponds to characteristics of the object, and a second portion of the set of codified input corresponds to a status of the object, wherein determining the 3D model based on the data associated with the object includes:

selecting, from a plurality of candidate 3D models, the 3D model based on the first portion of the set of codified input.

17. The method of claim 16, wherein the data associated with the object includes data of the event associated with the object, the method further comprising:

determining the plurality of candidate 3D models based on the data of the event.

18. The method of claim 17, further comprising:

generating the infrastructure as code based on a cloud computing platform for generating the metaverse.

19. The method of claim 15, wherein generating a set of output code is performed by an artificial intelligence (AI) model, the AI model including a set of parameters, and the method further includes training the AI model by:

collecting data associated with past events; and iteratively adjusting at least one respective set of parameters of the AI model based on the data associated with past events.

20. The method of claim 19, further comprising:

updating the AI model by adjusting at least one respective set of parameters based on at least one of the data associated with the event, the set of codified input, the 3D model, the infrastructure as code, or the set of output code.

* * * * *